United States Patent [19]

Sekiyama et al.

[11] Patent Number: 4,457,547
[45] Date of Patent: Jul. 3, 1984

[54] BUMPER REINFORCEMENT STRUCTURE FOR VEHICLES

[75] Inventors: Kenichi Sekiyama; Yasuhiro Mishima; Hisao Hiraiwa, all of Toyota; Joichiro Segawa, Chigasaki, all of Japan

[73] Assignees: Toyota Jidosha Kogyo Kabushiki Kaisha, Aichi,

[21] Appl. No.: 365,045

[22] Filed: Apr. 2, 1982

[30] Foreign Application Priority Data

Nov. 6, 1981 [JP] Japan .................................. 56-177250

[51] Int. Cl.³ ............................................. B60R 19/00
[52] U.S. Cl. ..................................... 293/110; 293/120; 293/132
[58] Field of Search ............... 293/120, 109, 146, 110, 293/132

[56] References Cited

U.S. PATENT DOCUMENTS 3,989,292 11/1976 Bank et al. ........................... 293/110
4,072,334 2/1978 Seegmiller et al. ................. 293/110

FOREIGN PATENT DOCUMENTS 55-49226 4/1980 Japan .
5713353 12/1980 Japan .
57-17743 8/1982 Japan .

OTHER PUBLICATIONS

36th Annual Conference, Reinforced Plastics/Composites Institute The Society of the Plastics Industry, Inc. Cession 17-C. SPI paper (1981) by Ford Co. Feb. 16-20, 1981 in U.S.A.

Primary Examiner—Richard A. Bertsch
Attorney, Agent, or Firm—Parkhurst & Oliff

[57] ABSTRACT

The fiberglass reinforced plastics bumper reinforcement fitted with an elastic bumper—which is laterally mounted to the vehicle and which consists, in cross section, of a plurality of rectangular frames stacked in layer—is characterized by forwardly projecting strips formed at the intersections between the front wall of the bumper reinforcement and the top and bottom plates of the reinforcement as well as the horizontally extending webs. These projecting strips on the front wall of the bumper reinforcement alleviate the stress concentrations at these intersections that might be caused when an impact load is applied to the elastic bumper and therefore the bumper reinforcement, thus increasing the fracture strength of the intersections of the bumper reinforcement. The bumper reinforcement is further characterized in that at least one of the top and bottom projecting strips is provided with a protrusion raised upward or downward from the outer surface of the top or bottom plate to further reduce the stress concentration at the intersections.

8 Claims, 5 Drawing Figures

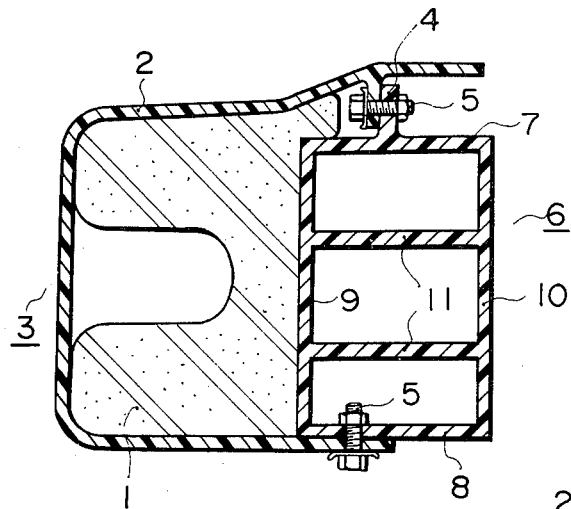
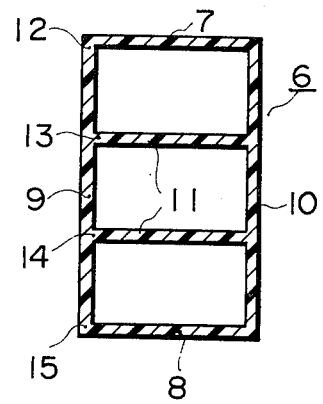
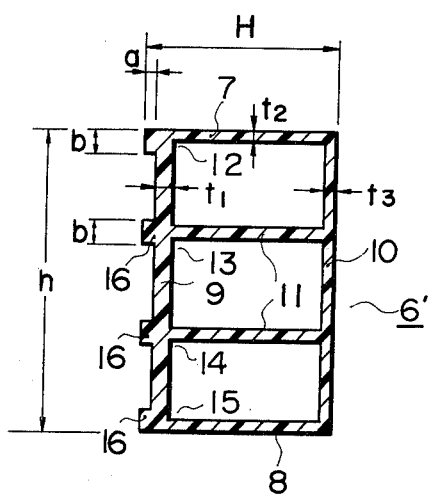
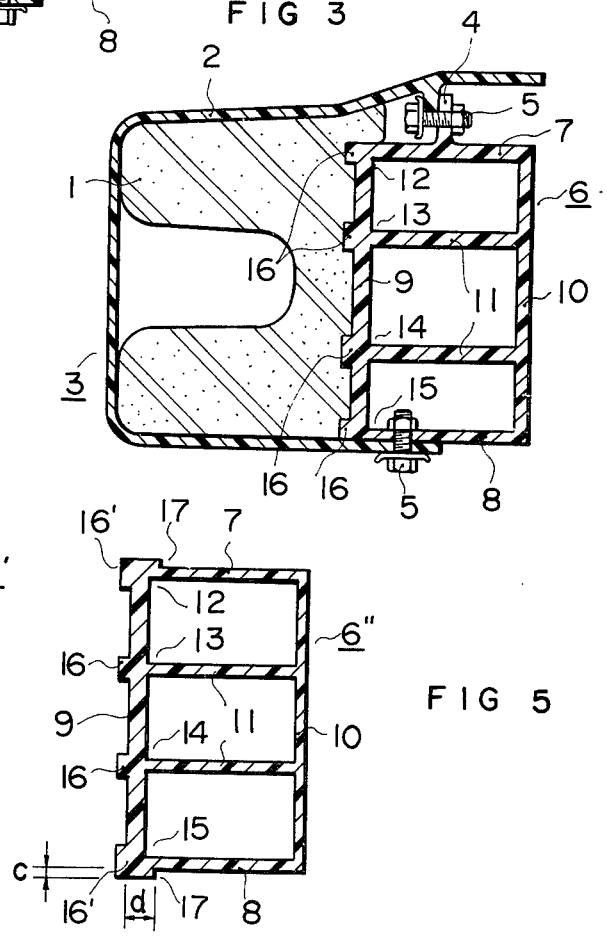

BUMPER REINFORCEMENT STRUCTURE FOR VEHICLES

BACKGROUND OF THE INVENTION

1. Field of the Invention

This invention belongs to the technical field of reducing the weight and increasing the strength of the fiberglass reinforced plastics (FRP) bumper reinforcement for vehicles such as automobiles that functions as a backup beam member for an elastic bumper.

This invention relates to the FRP bumper reinforcement structure for vehicles: which is mounted laterally on the front and rear of the vehicle such as automobile as a backup beam member for supporting an elastic bumper consisting of an urethane foam core member and an urethane elestomer crust member fitted over the urethane foam core member; and which is rectangular in cross section and has at least one horizontally extending reinforcement web between the top and bottom plates thereof. And more particularly, this invention relates to the bumper reinforcement structure for vehicles in which forwardly projecting strips are formed on the front wall of the bumper reinforcement at intersections between the front wall and the top and bottom plates as well as the reinforcement web.

2. Description of the Prior Art

As is known, the front and rear of automobiles are fitted with a bumper as a safety means. For improved safety, light weight and improved fuel efficiency, an increasing number of elastic bumpers are being used which consists of an urethane foam core member and an urethane elastomer crust member fitted over the core member.

The bumper reinforcement as a backup beam member which supports the elastic bumper has conventionally been made of metal and formed into a closed shape in cross section. To reduce the weight and increase the shock absorbing capacity and the fracture strength, the bumper reinforcement that is formed by pultrusion process from fiberglass reinforced plastics has come to be used on wide scale.

That is, as shown in FIGS. 1 and 2, the elastic bumper 3 consisting of the urethane foam core member 1 and the urethane elastomer crust member 2 fitted over the core member 1 is mounted to the FRP pultruded bumper reinforcement 6 by fixing it to the bracket 4 of the bumper reinforcement 6 with bolts 5.

The bumper reinforcement 6 which is closed in section and extends linearly or curved is mounted laterally. The bumper reinforcement 6 has between the top and bottom plates 7, 8 thereof one to three horizontally extending reinforcement webs 11 connecting the front and rear walls 9, 10 so as to prevent the front wall 9 from being broken when applied with an impact load, without increasing the weight of the bumper reinforcement.

However, since the fiberglass reinforced plastics, from which the bumper reinforcement 6 is formed, consists of a one-way glass roving (60-80%) and, as matrix resin, unsaturated polyester resin, epoxy resin and vinyl ester resin, it has a conspicuous characteristic of anisotropy. That is, the bumper reinforcement has a reasonably high tensile strengh in the direction of the fiber orientation; however, the tensile strength in the direction perpendicular to the fiber orientation is low. This is frequently observed with the product formed by pultrusion process from the fiber reinforced thermosetting resin. Due to this anisotropy characteristic of the pultruded fiberglass reinforced plastics, the bumper reinforcement has not sufficient rigidity and is easily deformed. Therefore, although it has a reasonably high tensile strength in lateral direction, it is very likely that the bumper reinforcement will easily be broken when an excessive impact load is applied from the front wall 9. Particularly the intersections 12, 13, 14, 15 between the front wall 9 and the top and bottom plates 7, 8 and the reinforcement webs 11 are susceptible to fracture because stress concentration will occur at these intersections when impact load is applied.

This is verified by the experiments using actual bumper reinforcement which showed that the actual strength of the bumper reinforcement is much lower than the estimation calculated from the bending strength of the test piece.

SUMMARY OF THE INVENTION

The primary object of this invention is to provide a vehicle bumper reinforcement structure attached with an elastic bumper which, to overcome the aforementioned drawbacks, has forwardly projecting strips formed at the intersections between the front wall and the top and bottom plates as well as the reinforcement webs to alleviate the stress concentration, thus preventing the bumper reinforcement from being easily broken.

The second object of this invention is to provide a bumper reinforcement structure in which at least one of the top and bottom projecting strips is provided with a upward or downward protrusion raised from the outer surface of the top or bottom plates to increase the fracture strength of the bumper reinforcement.

BRIEF DESCRIPTION OF THE DRAWINGS

FIG. 1 is an explanatory drawing showing the bumper and the conventional bumper reinforcement assembled together;

FIG. 2 is an explanatory drawing of the conventional bumper reinforcement;

FIG. 3 is an explanatory drawing of the bumper and one embpdiment of the bumper reinforcement according to this invention assembled together;

FIG. 4 is an explanatory drawing of the bumper reinforcement of this invention; and FIG. 5 is an explanatory drawing of another embodiment of the bumper reinforcement.

DETAILED DESCRIPTION OF THE PREFERRED EMBODIMENTS

Referring to FIGS. 3 and 4, designated 3 is an elastic bumper which is mounted to the front and rear of an automobile not shown. As with the conventional elastic bumper, this elastic bumper consists of a core member 1 made of urethane foam and a crust member 2 of urethane elestomer containing the urethane foam core member 1. The elastic bumper 3 is securely mounted by bolts 5 to the bumper reinforcement 6' of fiberglass reinforced plastics (FRP) with the upper portion of the crust member 2 bolted to the bracket 4 on the top plate 7 of the bumper reinforcement 6' and with the end of the lower part of the crust member 2 bolted to the bottom plate 8.

The FRP bumper reinforcement 6' is made up mainly of a one-way glass roving (60–80 wt %) and, as matrix resin, unsaturated polyester resin, epoxy resin and vinyl ester resin. The bumper reinforcement 6' is formed by the pultrusion process into the layer construction consisting of three rectangular frames which is linear or curved in lateral direction and is secured to an arm not shown.

The FRP bumper reinforcement 6' has between the top and bottom plates 7, 8 two reinforcement webs 11 (the number of webs may be increased to three according to the design) integrally interconnecting the front and rear walls 9, 10. These reinforcement webs not only reinforce the strength of the bumper reinforcement 6' but also reduce its weight.

At the intersections 12, 13, 14, 15 between the front wall 9 and the top and bottom plates 7, 8 as well as the reinforcement webs 11, there are formed strips 16 projecting toward the elastic bumper 3.

The result of our experiments shows that the front wall 9 has the greatest fracture strength when the height a (in FIG. 4) of the projected strips 16 is within the range 0.5 to 1.0 times the thickness t1 of the front wall 9 and the thickness b of the projected strips 16 is within the range 2.0 to 4.0 times the thickness of the top and bottom plates 7, 8 and the reinforcement webs 11.

The dimensions of the bumper reinforcement subjected to our experiments range as follows. Width H of the bumper reinforcement 6'=50~70 mm, height h of the bumper reinforcement 6'=90~120 mm, thickness t1 of the front wall 9=2.5~5.0 mm, thickness t2 of top and bottom plates 7, 8 and reinforcement webs 11=2.5~3.5 mm, thickness t3 of the rear wall 10=2.5~4.0 mm. From these dimensions, we determined the height of projections 16 at a=1.5~5.0 mm and the thickness of projections 16 at b=5.0~14.0 mm.

In the above construction, when an impact load is applied to the elastic bumper 3 from, for instance, the front of the bumper, i.e., from the left side of FIG. 3, the impact load is absorbed through the crust member 2 by the core member 1. But when the load is excessively large or greater than the capacity of the core member 1, then the load is applied to the front wall 9 of the bumper reinforcement 6'.

In this case, since the bumper reinforcement 6' of this invention is provided with forwardly projecting strips 16 at the intersections 12, 13, 14, 15, the stress concentration at these intersections is alleviated, which in turn increases the fracture strength of the bumper reinforcement 6' and prevents it from being easily broken.

We conducted four-point bending tests on the bumper reinforcement 6' of this invention shown in FIG. 4 and the conventional bumper reinforcement of FIG. 2. The results of these tests are as follows.

For the conventional type bumper reinforcement: weight=3.82 kg, fracture load=4.20 ton, stress on the compression side at the bending fracture=29.1 kg/mm$^2$.

For the bumper reinforcement of this invention: weight=3.95 kg, fracture load=5.13 ton, stress on the compression side at the bending fracture=35.5 kg/mm$^2$.

As can be seen from the above test result, it has been demonstrated that while the bumper reinforcement of this invention increased about 3% in weight due to the addition of projections 16, the fracture strength increased as much as 22%.

In another embodiment, as shown in FIG. 5, a bumper reinforcement 6'' is characterized in that the projected strips 16' at the top and bottom intersections 12 and 15 also protrude upward or downward from the outer surface of the top and bottom plates 7, 8 with the surfaces of the vertically raised portions 17 parallel to the surfaces of the top and bottom plates 7, 8. The protrusions formed at the upper side of the top projected strip 16' and at the lower side of the bottom projected strip 16' are to reinforce the fracture strength at these projected strips 16' to that of the intermediate projected strips 16 which contact the front wall 9 on both the upper and lower sides.

Thus, all the proejcted strips 16', 16 give equal facture strength at these intersections 12, 13, 14, 15. According to the test result, the optimum size of height c of vertically raised portions 17 of the top and bottom projected strips 16' is found to be within the range of 0.5 to 1.0 times the thickness t2 of the top and bottom plates 7, 8; and the width d of the protrusions 17 as measured from the front to the back is found most effective in the range of 1.5 to 2.0 times the thickness t1 of the front wall 9.

Therefore, if the impact load greater than the shock absorbing capacity of the elastic bumper 3 is applied to the bumper 3 and the front wall 9 of the bumper reinforcement 6'', the reinforced strength at these intersections 12, 13, 14, 15 prevents these intersections from being fractured easily.

It should be noted that the present invention is not limited to the above embodiments and various modifications may be made. For example, one of the top and bottom projected strips 16' of FIG. 5 may be replaced with the top or bottom projected strip of FIG. 4 with no vertical protrusion.

It goes without saying that the bumper reinforcement can be mounted to the front and rear of the automobile.

The advantages of this invention may be summarized as follows.

Since the FRP bumper reinforcement, which is closed and rectangular in cross section and has a bracket for mounting to the elastic bumper, has forwardly projecting strips at the intersections between the front wall of the bumper reinforcement and the top and bottom plates as well as the intermediate reinforcement webs between the top and bottom plates, the fracture strength of these intersections is increased, with the result that if an impact load in excess of the shock absorbing capacity of the elastic bumper is applied to the front wall of the bumper reinforcement, no stress concentration will be generated at these intersections thereby protecting the bumper reinforcement from facture.

Moreover, since at least one of the top and bottom projecting strips is provided with an upwardly or downwardly raised protrusion with its surface parallel to the outer surface of the top or bottom plate to increase the strength of the top or bottom projecting strip almost equal to the strength of the intermediate projecting strips which are continuous with the front wall on both the upper and lower sides, all the projecting strips can provide an equally reinforced fracture strength.

Furthermore, since the projected strips are formed along the longitudinal direction, the FRP bumper reinforcement can smoothly be pultruded without any trouble and no special design is required on the pultrusion device, thus giving no adverse effects on the cost and production efficiency.

We claim:

1. A bumper reinforcement structure for vehicles comprising: a fiberglass reinforced plastics (FRP) bumper reinforcement laterally mounted to the vehicle, the bumper reinforcement being rectangular in cross section and having a bracket for mounting the elastic bumper to the front thereof; at least one horizontally extending reinforcement web provided between the top and bottom plates of the bumper reinforcement to connect the front and rear walls of the bumper reinforcement; and forwardly projecting strips formed at the intersections between the front wall and the top and bottom plates as well as the reinforcement webs.

2. A bumper reinforcement structure for vehicles as set forth in claim 1, wherein the projecting strips have the dimensional relationship of $0.5\ t1 < a < 1.0\ t1$ and $2.0\ t2 < b < 4.0\ t2$, where a and b are the height and width of the projected strips respectively and t1 and t2 are the thickness of the front wall and the thickness of the top and bottom plates and reinforcement webs.

3. A bumper reinforcement structure for vehicles comprising: a fiberglass reinforced plastics (FRP) bumper reinforcement laterally mounted to the vehicle, the bumper reinforcement being rectangular in cross section and having a bracket for mounting the elastic bumper to the front thereof; at least one horizontally extending reinforcement web provided between the top and bottom plates of the bumper reinforcement to connect the front and rear walls of the bumper reinforcement; and forwardly projecting strips formed at the intersections between the front wall and the top and bottom plates as well as the reinforcement webs, at least one of the top and bottom projecting strips being provided with an upwardly or downwardly raised protrusion with its surface parallel to the outer surface of the top or bottom plate.

4. A bumper reinforcement structure for vehicles as set forth in claim 3, wherein the protrusions of the top and bottom projecting strips are sized so as to meet the dimensional relationship of $0.5\ t2 < c < 1.0\ t2$ and $1.5\ t1 < d < 2.0\ t1$, where c represents the height of the protrusions as measured from the outer surface of the top and bottom plates, d the width of the protrusions from the front to the back, and t1 and t2 the thickness of the front wall and of the top and bottom plates, respectively.

5. A bumper reinforcement structure for vehicles comprising:
a fiberglass reinforced plastics bumper reinforcement laterally mounted to a vehicle, said bumper reinforcement being rectangular in cross-section and having a bracket for mounting an elastic bumper to the front thereof;
at least one horizontally extending reinforcement web provided between top and bottom plates of said bumper reinforcement to connect front and rear walls of said bumper reinforcement; and
forwardly projecting strips formed on said front wall of said bumper reinforcement along the intersections between the front wall and each of the top and bottom plates and said at least one reinforcement web, said projecting strips having a width greater than the thickness of said at least one reinforcement web.

6. The bumper reinforcement structure as set forth in claim 5 wherein the projecting strips have the dimensional relationship of $0.5\ t1 < a < 1.0\ t1$ and $2.0\ t2 < b < 4.0\ t2$, where a is the height of the projecting strips, b is the width of the projecting strips, t1 is the thickness of the front wall, and t2 is the thickness of the top plate, bottom plate and said at least one reinforcement web.

7. A bumper reinforcement structure for vehicles comprising:
a fiberglass reinforced plastics bumper reinforcement laterally mounted to a vehicle, said bumper reinforcement being rectangular in cross-section and having a brack for mounting an elastic bumper to a front thereof;
at least one horizontally extending reinforcement web provided between a top and bottom plate of said bumper reinforcement to connect front and rear walls of said bumper reinforcement; and
forwardly projecting strips formed on said front wall of said bumper reinforcement along the intersections between the front wall and each of the top plate, bottom plate and said at least one reinforcement web, said projecting strips having a width greater than the thickness of said at least one reinforcing web and at least one of said projecting strips at the intersection of the front wall and the top and bottom plates having one of an upwardly and downwardly raised protrusion with a surface parallel to a surface of said one of said top and bottom plates.

8. The bumper reinforcement structure for vehicles as set forth in claim 7 wherein the protrusion of said at least one of said projecting strips are sized to have the dimensional relationship of $0.5\ t2 < c < 1.0\ t2$ and $1.5\ t1 < d < 2.0\ t1$, where c represents the height of the protrusion as measured from the outer surface of the top and bottom plates, d represents the width of the protrusions from front to back, t1 represents the thickness of the front wall, and t2 represents the thickness of the top and bottom plates.

* * * * *

UNITED STATES PATENT AND TRADEMARK OFFICE
CERTIFICATE OF CORRECTION

PATENT NO. : 4,457,547

DATED : July 3, 1984

INVENTOR(S) : Kenichi Sekiyama et al.

It is certified that error appears in the above-identified patent and that said Letters Patent is hereby corrected as shown below:

Item [73] Assignees:, should read

-- [73] Assignees: Toyota Jidosha Kogyo Kabushiki Kaisha, Aichi, Japan, and Asahi Glass Company, Ltd., Tokyo, Japan. --

Signed and Sealed this

Fourth Day of December 1984

[SEAL]

Attest:

GERALD J. MOSSINGHOFF

Attesting Officer    Commissioner of Patents and Trademarks